(12) United States Patent
Benevelli et al.

(10) Patent No.: US 11,155,165 B2
(45) Date of Patent: Oct. 26, 2021

(54) PLANETARY GEAR PTO UNIT WITH A HYDRAULIC CONTROL, WORK VEHICLE COMPRISING THE SAME AND PTO TORQUE ESTIMATION

(71) Applicant: CNH Industrial America LLC, New Holland, PA (US)

(72) Inventors: Alessandro Benevelli, Albinea (IT); Marco Pietro Ciarrocchi, Sant'Omero (IT)

(73) Assignee: CNH Industrial America LLC, New Holland, PA (US)

( * ) Notice: Subject to any disclaimer, the term of this patent is extended or adjusted under 35 U.S.C. 154(b) by 57 days.

(21) Appl. No.: 16/610,670

(22) PCT Filed: May 2, 2018

(86) PCT No.: PCT/EP2018/061195
§ 371 (c)(1),
(2) Date: Nov. 4, 2019

(87) PCT Pub. No.: WO2018/202703
PCT Pub. Date: Nov. 8, 2018

(65) Prior Publication Data
US 2020/0156469 A1 May 21, 2020

(30) Foreign Application Priority Data
May 3, 2017 (IT) .......................... 102017000047756

(51) Int. Cl.
*B60K 25/06* (2006.01)
*B60K 17/28* (2006.01)
(Continued)

(52) U.S. Cl.
CPC .............. *B60K 25/06* (2013.01); *B60K 17/28* (2013.01); *F16H 47/10* (2013.01);
(Continued)

(58) Field of Classification Search
CPC .. B60K 25/06; B60K 17/28; B60K 2025/065; F16H 47/10; F16H 57/0486; F16H 61/42; F16H 61/44; F16H 2702/00
See application file for complete search history.

(56) References Cited

U.S. PATENT DOCUMENTS

| 5,997,425 A | 12/1999 | Coutant et al. |
| 7,048,106 B2 * | 5/2006 | Hou ................... B60W 30/1888 192/103 F |
| 2020/0391589 A1 * | 12/2020 | Azuma ................... F16D 67/04 |

FOREIGN PATENT DOCUMENTS

| DE | 102008059029 A1 | 5/2010 |
| EP | 2949497 A1 | 12/2015 |

(Continued)

OTHER PUBLICATIONS

International Search Report for Application No. PCT/EP2018/061195 dated Sep. 11, 2018 (11 pages).

*Primary Examiner* — Tisha D Lewis
(74) *Attorney, Agent, or Firm* — Peter Zacharias; Patrick Sheldrake

(57) ABSTRACT

A power-takeoff (PTO) unit for a work vehicle includes a planetary gear driven by an engine of the work vehicle; a PTO spline connected in power transmission to the planetary gear and defining a gear ratio; a hydrostatic transmission driven by the planetary gear to control the gear ratio; a pressure sensor unit for sensing a differential pressure across a loop of the hydrostatic transmission; and a control unit. The control unit is configured to calculate a differential pressure in the loop from a calibration mathematical model representing an unloaded functioning of the PTO spline. The control unit is also configured to calculate a PTO spline torque from a further mathematical model. The model is based on the pressure drop, on pressure signals from the (Continued)

sensor unit, and on kinematic or hydraulic factors of the planetary gear and the hydrostatic transmission.

12 Claims, 3 Drawing Sheets

(51) Int. Cl.
    *F16H 47/10*         (2006.01)
    *F16H 61/42*         (2010.01)
    *F16H 57/04*         (2010.01)
    *F16H 61/44*         (2006.01)

(52) U.S. Cl.
    CPC ......... *F16H 57/0486* (2013.01); *F16H 61/42* (2013.01); *F16H 61/44* (2013.01); *B60K 2025/065* (2013.01); *F16H 2702/00* (2013.01)

(56) References Cited

FOREIGN PATENT DOCUMENTS

| | | | |
|---|---|---|---|
| WO | 2013029054 | A1 | 2/2013 |
| WO | 2014095148 | A1 | 6/2014 |

\* cited by examiner

PLANETARY GEAR PTO UNIT WITH A HYDRAULIC CONTROL, WORK VEHICLE COMPRISING THE SAME AND PTO TORQUE ESTIMATION

The present invention relates to a PTO unit having a planetary gear and a hydraulic control for the gear ratio of the planetary gear. Such PTO unit can be carried on a work vehicle, e.g. an agricultural vehicle or a construction equipment vehicle.

BACKGROUND OF THE INVENTION

It is known to provide a tractor with a PTO unit comprising a PTO spline, suitable for connection with an agricultural implement, a planetary gear connected to an internal combustion (IC) engine of the tractor to power the implement via the PTO and a hydraulic control circuit comprising a hydraulic pump and a hydraulic motor connected to the planetary gear to continuously vary the gear ratio of the planetary gear. Variation of the gear ratio may be either automatically controlled by an electronic control unit or manually adjusted by the operator so as to adapt the PTO speed to various needs.

Such PTO unit decouples rotational speed of the IC engine with that of the PTO. This is useful to provide a better control to implements. In order to provide an even better control of the implement, it is important to control or estimate the torque applied by the PTO to the implement in every working condition of the PTO.

The scope of the present invention is to provide a simple estimation of torque transmitted via the PTO spline.

SUMMARY OF THE INVENTION

In accordance with an aspect of the present invention, there is provided a power take-off (PTO) unit for a work vehicle. The PTO unit comprises a planetary gear having a first shaft for connection with an engine of the work vehicle, a PTO spline connected in power transmission to the planetary gear and defining a gear ratio with the first shaft, a hydrostatic transmission driven by the planetary gear to control the gear ratio, a pressure sensor unit for sensing a differential pressure across a loop of the hydrostatic transmission, and a control unit. The control unit is programmed to calculate: a differential pressure drop in the loop on the basis of an actual kinematic status of the planetary gear and from a calibration mathematical model representing an unloaded functioning of the PTO spline; and a PTO spline torque from a further mathematical model based on the pressure drop, on pressure signals from the sensor unit, and on kinematic or hydraulic factors of the planetary gear and the hydrostatic transmission.

In accordance with another aspect of the present invention, there is provided a working vehicle comprising a power take-off (PTO) unit. The PTO unit comprises a planetary gear having a first shaft for connection with an engine of the work vehicle, a PTO spline connected in power transmission to the planetary gear and defining a gear ratio with the first shaft, a hydrostatic transmission driven by the planetary gear to control the gear ratio, a pressure sensor unit for sensing a differential pressure across a loop of the hydrostatic transmission, and a control unit. The control unit is programmed to calculate: a differential pressure drop in the loop on the basis of an actual kinematic status of the planetary gear and from a calibration mathematical model representing an unloaded functioning of the PTO spline; and a PTO spline torque from a further mathematical model based on the pressure drop, on pressure signals from the sensor unit, and on kinematic or hydraulic factors of the planetary gear and the hydrostatic transmission.

In accordance with yet another aspect of the present invention, there is provided a method to estimate torque at a power take-off (PTO) spline of a PTO unit for a work vehicle. The work vehicle comprises a planetary gear having a first shaft for connection with an engine of the work vehicle, a PTO spline connected in power transmission to the planetary gear and defining a gear ratio with the first shaft, a hydrostatic transmission driven by the planetary gear to control the gear ratio, and a pressure sensor unit for sensing a differential pressure across a loop of the hydrostatic transmission. The method comprises steps of calculating a differential pressure drop in the loop on the basis of an actual kinematic status of the planetary gear and from a first mathematical model representing an unloaded functioning of the PTO spline; and calculating the PTO spline torque from a further mathematical model based on the pressure drop, on pressure signals from the sensor unit, and on kinematic or hydraulic factors of the planetary gear and the hydrostatic transmission.

BRIEF DESCRIPTION OF THE DRAWINGS

For a better understanding of the present invention, the latter will further be disclosed with reference to the accompanying figures in which.

DETAILED DESCRIPTION OF THE DRAWINGS

Figure 1:
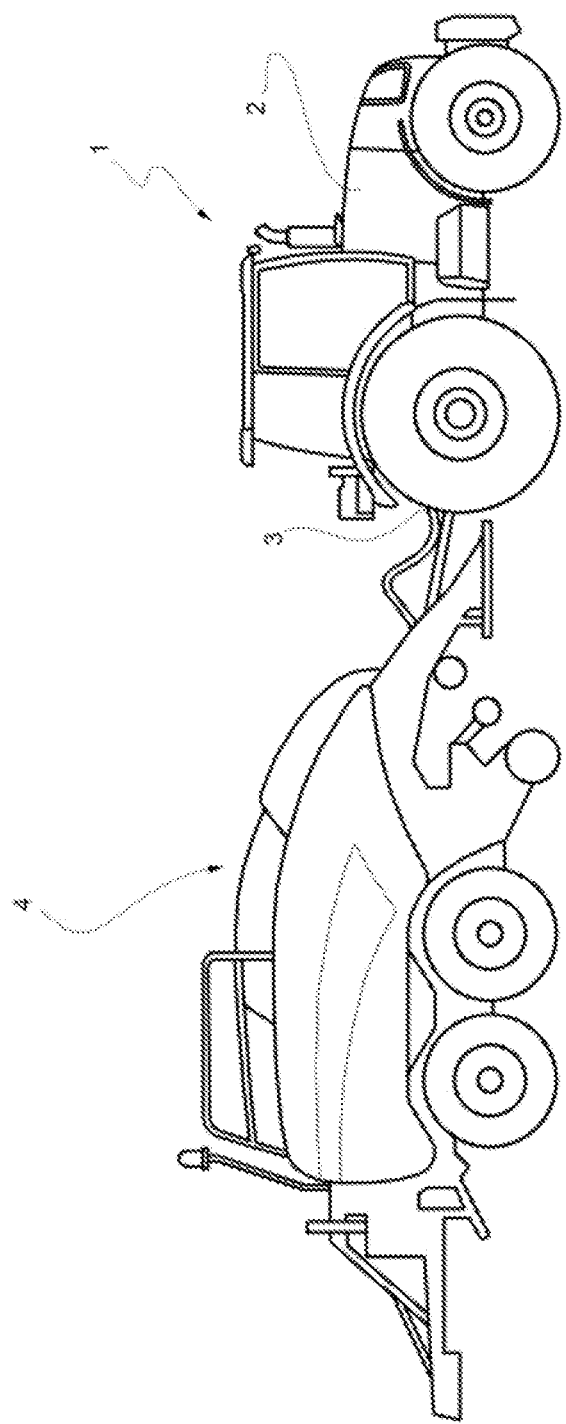
FIG. 1 is a schematic view of a working vehicle attached to an implement.

FIG. 1 refers as a whole to an agricultural system comprising a tractor 1 having a mechanical power source, i.e. a traction IC engine 2, and a PTO 3; and an implement, e.g. a square baler 4 trailed by tractor 1 and coupled in torque transmitting manner to PTO 3.

Figure 2:
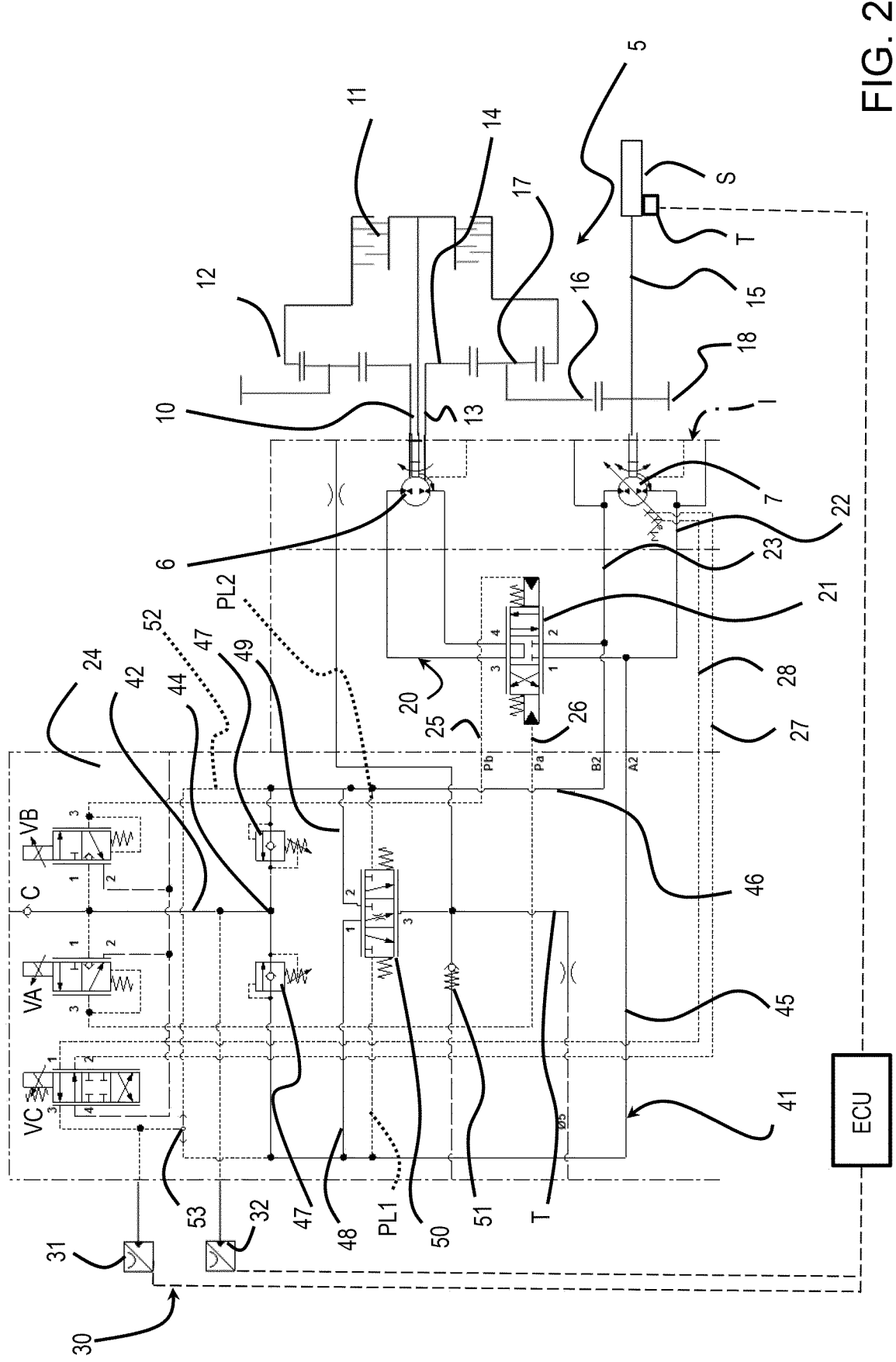
FIG. 2 is a functional scheme of a planetary PTO unit according to the present invention.

FIG. 2 discloses a PTO unit comprising a PTO spline S for coupling with the implement, a planetary gear 5 and a combination of a first and a second hydraulic rotary power device 6 and 7 to control gear ratio of planetary gear 5 so as to command PTO spline S. At least one of power devices 6 and 7 has a variable displacement expressed as a maximum displacement V times a percentage α indicating the actual displacement; and an efficiency ε. When α is zero, a reference gear ratio is defined between the angular speeds of PTO spline S and IC engine 2. According to the embodiment of FIG. 2, when α is greater than zero the angular speed of PTO spline S increases with respect to that of IC engine 2 and power device 6 has a first rotating direction. When α is lower than zero, PTO spline decreases below the angular speed of IC engine and power device 6 has a second rotating direction opposed to the first rotating direction. Furthermore, in case one of power devices 6, 7 has a fixed displacement, the other power device has a maximum displacement greater than said fixed displacement. This increases the use range of the PTO unit.

Power devices 6, 7 are hydraulically connected in flow recirculation, i.e. the flow generated by one power device is used by the other power device during functioning of implement 4. This provides a hydrostatic transmission and can be obtained, for example, by connecting in a closed hydraulic loop an output of power device 6 to an input of power device 7 and an output of power device 7 to an input of power device 6.

According to the example of FIG. 2, power device 6 is connected in a torque transmitting manner to planetary gear and has a constant displacement and power device 7 is connected in a torque transmitting manner to PTO spline S and has a variable displacement. Other configurations, e.g. the reverse, are possible.

According to the invention, planetary gear 5 is connected to IC engine 2, to one of the hydraulic power devices 6 and to PTO spline S. The other hydraulic power device 7 is connected to PTO spline S in parallel to planetary gear 5 so that a functioning torque path between PTO spline S and hydraulic power device 6 is through planetary gear 5 and a functioning torque path between PTO spline S and power device 7 is not through planetary gear 5.

With reference to the embodiment of FIG. 2, a first input shaft 10 driven by IC engine 2 is couplable to planetary gear 5 by means of a clutch 11. In particular, the first input shaft 10 is couplable to an annular gear 12 of planetary gear 5.

Furthermore, a second input shaft 13 is connected between hydraulic power device 6 and a sun gear 14 of the planetary gear 5. Preferably, shaft 10 and shaft 13 are concentric, in particular shaft 13 surrounds shaft 10.

Hydraulic power device 7 is connected to PTO spline S by a shaft 15. Shaft 15 allows PTO spline S to be connected to planetary gear 5. To this end, a carrier 16 is coupled to annular gear 12 by satellites 17 and meshes with a gear wheel 18 of shaft 15. Furthermore, according to the embodiment of FIG. 2, clutch 11 selectively decouples shaft 10 and carrier 16.

Hydraulic power devices 6, 7 are hydraulically connected by a loop 20 for closed circular flow within the hydrostatic transmission. Loop 20 is intercepted by a control valve 21 that is configured to have a neutral position and two working positions to control direction of flow circulation in loop 20 and of rotating direction of power device 6. In particular, in a first working position of control valve 21, flow circulation in loop 20 has a fist direction and in a second working position flow circulation in loop 20 has a second direction, opposite to the first direction. Accordingly, one of power devices 6, 7, e.g. fixed displacement power device 6, has a reversible rotating direction.

Preferably, neutral position of control valve 21 is an open center for power device 6 attached to planetary gear 5 so that shaft 13 rotates without power consumption except friction and pressure drops along the tubes; and a closed center for power device 7 attached to PTO spline S. Furthermore, lines 22, 23 for connection of power device 7 to control valve 21 are respectively connected to a control manifold 24 that will be discussed further in a following paragraph.

To control manifold 24 are also connected piloting lines 25, 26 for selecting a function mode, i.e. neutral mode or one of the working modes, of control valve 21, and piloting lines 27, 28 for controlling actual displacement of power device 7.

Finally, PTO unit 1 further comprises a pressure sensor unit 30 for sensing the pressure difference across loop 20, which is a proxy for torque absorbed/inputted by power devices 6, 7. According to the embodiment of FIG. 2, pressure sensor unit 30 comprises a high pressure sensor 31 and a low pressure sensor 32. The former and the latter are respectively connected to a high pressure branch and a low pressure branch of loop 20, which may change in use depending on the working condition of the implement or auxiliary equipment coupled to PTO spline S. According to the embodiment of FIG. 2, branches of loop 20 comprise lines 22, 23, which are at a high or low pressure respectively and are connected to high pressure sensors 31, 32 via a bridge circuit of manifold 24 that will be explained in greater detail in a following paragraph. In this way, manifold 24 ensures that high pressure sensor 31 is always connected to the high pressure branch of loop 20 and that low pressure sensor 32 is always connected to the low pressure branch of loop 20.

According to the present invention, after measurement of actual pressure difference between low pressure branch and high pressure branch of loop 20, it is possible to estimate a torque available at PTO spline S during functioning. In particular, a method to estimate available torque transferred between PTO spline S and an implement in a functioning condition of the implement comprises the following steps:

calculating a pressure drop in loop 20 on the basis of an actual kinematic status of planetary gear 5 and from a calibration mathematical model representing an unloaded functioning of the PTO spline S;

calculating PTO torque from a further mathematical model based on the above pressure drop, on actual differential pressure measured by sensor unit 30 and on kinematic/hydraulic factors of planetary gear 5 and hydraulic machines 6, 7.

Figure 3:
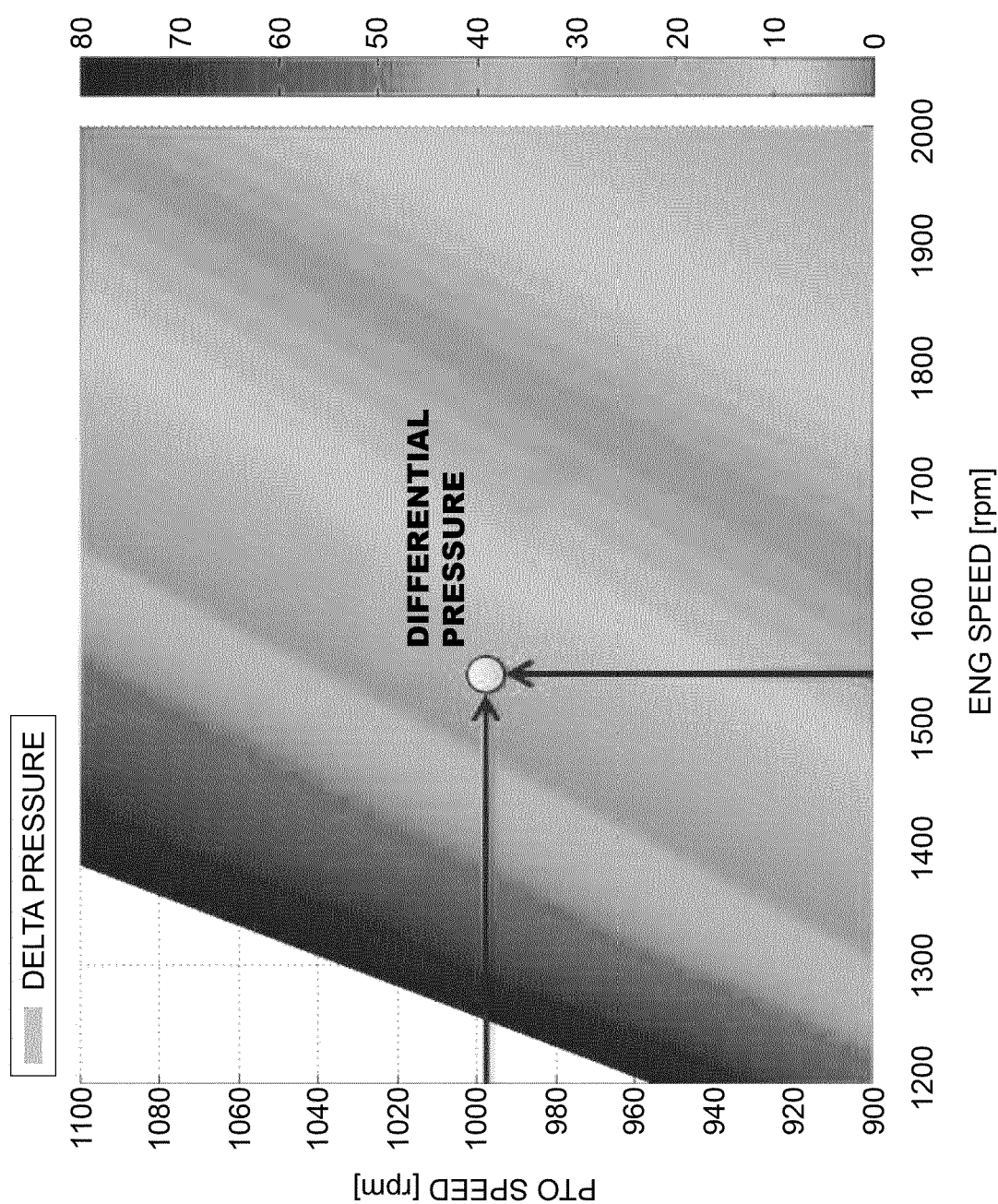
FIG. 3 is a map representing a mathematical model for PTO torque estimation according to the present invention.

FIG. 3 shows a map indicating the range of differential pressure measured by sensor unit 30 when PTO spline S is unloaded. The pressure difference is indicated over a range of IC engine speed and PTO spline speed. Both speeds are normally measured by suitable speed sensors T and do not require additional measure instruments with respect to those already provided on tractors or other working vehicles provided with a PTO.

Furthermore, the following equations shall be considered:

$$T_6 = \frac{V_6 * (\Delta p - \Delta p_0)}{2\pi} * \epsilon = T_{eng} * \frac{z_{sun}}{z_{ring}} \qquad a)$$

$$T_7 = \frac{\alpha * V_7 * (\Delta p - \Delta p_0)}{2\pi * \epsilon} \qquad b)$$

$$T_{carr} = T_{eng} * \frac{-(z_{sun} + z_{ring})}{z_{ring}} \qquad c)$$

where:
$z_{sun}$=number of teeth of sun gear 14;
$z_{ring}$=number of teeth of ring gear 12;
$V_6$=hydraulic fixed displacement of hydraulic machine 6;
$V_7$=maximum displacement of hydraulic machine 7;
$\alpha$=fractional displacement of hydraulic machine 7.

When greater than zero, power unit 6 rotates in one direction and when lower than zero power unit 6 rotates in the other direction. According to the embodiment of FIG. 2, direction of rotation of power unit 6 is controlled via control valve 21 and the position of such valve shall be considered to attribute a suitable sign to $\alpha$;

$\epsilon$=mechanical-hydraulic efficiency of hydraulic machines 6, 7;

$\Delta p$=actual differential pressure measured by sensor unit 30, e.g. difference between outputs of sensor 31 and sensor 32;

$\Delta p_0$=is the pressure differential estimated from the zero-load map in FIG. 3 and indicating the value of the pressure drop within PTO unit 1 when there is no torque load applied to PTO spline S;

$T_6$, $T_7$, $T_{eng}$, $T_{carr}$=torque on hydraulic machine 6, hydraulic machine 7, IC engine 2 and carrier 16 respectively;

Equation a) is derived from torque equilibrium about solar shaft 13 and equations b) and c) are respective definitions.

Equation a) combines into equation c) to provide $T_{carr}$; and equation b) provides the calculation of PTO torque by substitution in the equation below, derived from torque equilibrium about shaft 15:

$$T_{PTO} = T_{carr} * R_c + T_7 \qquad (d)$$

where:

$T_{PTO}$=torque on the PTO spline (S); and $R_c$=gear ratio between carrier 16 and shaft 15.

Equation d) provides the torque estimation based on the map of FIG. 3, electric signals from sensor unit 30 and kinematic/hydraulic factors of planetary gear 5 and hydraulic machines 6, 7.

Equation d) shows that torque available at PTO spline S is the sum of two factors: a first factor is expressed in terms of hydraulic features of first hydraulic power machine 6 scaled by kinematic features, e.g. ratios of gear teeth numbers of planetary gear 5; and a second factor is expressed in terms of hydraulic features of second hydraulic power machine 7 not scaled by kinematic features of planetary gear 5. In particular, the provision of shaft 15 enables the definition of a hydraulic block comprising devices 6, 7 defining an interface I for connection to mechanical components, i.e. planetary gear 5 and PTO spline S. In particular, hydraulic components, e.g. both power devices 6, 7, are on one side of interface I, and mechanical power devices, e.g. planetary gear 5 and clutch 11, are on the other side of interface I. This provides a relatively simple layout that is particularly useful to drive PTO spline S.

In order to implement the above method, the PTO unit shall be electrically connected to an electronic control unit ECU programmed to:

calculate a pressure drop in loop 20 on the basis of an actual kinematic status of CVT 5 and from a calibration mathematical model representing an unloaded functioning of the PTO spline S;

calculate PTO torque from a further mathematical model based on the above pressure drop, on actual differential pressure measured by sensor unit 30 and kinematic/hydraulic factors of planetary gear 5 and hydraulic machines 6, 7.

Control unit ECU is also programmable in order to control fractional displacement a. Such control may either be automatic, e.g. such to provide a compensation to implements applying a pulsation load to PTO spline S, such as a large square baler. Alternatively or in combination, control of fractional displacement a may be manual, e.g. the operator controls α in order to set a desired speed to PTO spline S either via control manifold 26 or via control unit ECU and a suitable user interface.

Preferably, the zero-load map of FIG. 3 is electronically stored and is accessible by control unit ECU in order to calculate the differential pressure in the unloaded condition of PTO spline S upon data from speed sensors T of PTO spline S and IC engine 2.

Zero-load map of FIG. 3 can be for example memorized during a calibration phase either completed during manufacturing or by a user, who controls IC engine 2 to ramp up from minimum to maximum rotation speed for a given set of α values, i.e. −100%, −75% ..., 75%, 100%. For each ramp, control unit ECU stores the relative values of differential pressure in loop 20 and the rotational speed of PTO spline S. Such values may be e.g. interpolated in order to provide an estimation of differential pressure during a zero-load operation of PTO spline S for each and every value of a and IC engine speed.

Preferably, control manifold 24 comprises a bridge line branching-off between lines 22, 23. Bridge line 41 receives pressurized hydraulic fluid from a feed line 42, which joins bridge line 41 in a node 44. Node 44 divides bridge 41 in a first branch 45 connected to line 22 and a second branch 46 connected to line 23. First and second branch 45, 46 are functionally symmetrical in order to control lines 22, 23 in all operating conditions, i.e. when line 22 is at a low pressure and line 23 is at a high pressure and vice versa.

In particular, each branch 45, 46 comprises a relief 47 fed by node 44 and having an internal check valve open so that flow from feed line 42 reaches the one of lines 22, 23 that is at the lower pressure.

Furthermore, first and second branch 45, 46 feed via respective conduits 48, 49 and pilot via respective piloting lines PL1, PL2 a three-position valve 50 for connection of conduits 48, 49 to a discharge line T. Via the pressure balance between piloting lines PL1 and PL2, valve 50 connects the branch 45, 46 having the lower pressure to discharge line T. Furthermore, the neutral position of control valve 50 is open and provides a connection to discharge line T. This sets, in combination with relief valves 47, a high pressure threshold in loop 20. Indeed, relief valves 47 are set to open when such high pressure threshold, e.g. 380 bar, is reached in one of branches 45, 46. After opening of the relief valve 47 of the higher pressure branch, bridge line 41 is pressurized at the high pressure threshold and valve reaches its neutral position for connection of both branches of bridge line 41 to discharge line T. Preferably, neutral position of three-position valve provides a lumped pressure drop in order to decrease pressure of the flow directed to discharge line T. Furthermore, in case the high pressure threshold of relief valves 47 is reached, backflow of hydraulic fluid is prevented by a check valve C upstream of feed line 42 upstream from node 44.

Optionally, the pressure of discharge line T is controlled via a pressure limiting valve 51 to a low pressure threshold value, e.g. 3 bar.

In order to select the high pressure value during functioning of the hydrostatic transmission connected to planetary gear 5, branches 45, 46 are bridged by a piloting branch 52 comprising a shuttle valve 53. Output of shuttle valve 53 is connected to a control valve VC that inputs piloting lines 27, 28 for variation of displacement a in hydraulic power machine 7.

Layout of manifold 24 provides fixed points between first and second branch 45, 46 where, throughout the working conditions of the hydrostatic transmission, a high pressure operating value thereof and a low pressure operating value are measured by high pressure sensor 31 and low pressure sensor 32. Preferably, high pressure sensor 31 is located at the output of shuttle valve 53 upstream of control valve VC and low pressure sensor 32 is located on feed line 42 upstream of node 44.

Manifold 24 further comprises a first and a second control valve VA, VB to control piloting lines 25, 26. Control valves VA, VB are preferably fed in parallel via feed line 42.

Control valves VA, VB and VC are controlled by the user of tractor 2 in order to select the functioning condition of PTO spline S. The control valves VA, VB and VC are preferably solenoid valves.

Furthermore, according to an embodiment, planetary gear 5 is fluid lubricated by a lubricating oil and is housed in a shell (not shown) or the like where lubricating oil is collected. Control manifold 24 is within the shell and, in order to avoid excessive contamination of the control valves VA, VB, VC by lubricating oil, such valves are located above the oil level inside the shell when planetary gear 5 is at rest and/or above shaft 15.

The advantages of a PTO unit according to the present invention are as follows.

Torque is calculated by sensing a differential pressure, which is cost effective and precise at the same time.

Differential pressure at zero PTO load is mapped for IC engine rotation speed and PTO spline rotation speed so that it is possible to use sensors normally provided on a tractor.

Open center of control valve 21 provides a safeguard that PTO spline S does not operate in case clutch 11 is closed and control valve 21 is in the neutral position. In particular, the open center is connected to hydraulic machine 6, which is connected to PTO spline S via planetary gear 5.

The interface I is a single interface dividing hydraulic power devices 6, 7, from mechanical power devices planetary gear 5 and clutch 11. This is particularly useful to adapt the PTO unit to the use of PTO spline S, which shall be clear for connection with implements. Furthermore, compactness along axial direction is increased.

The invention is not limited to the embodiments described in the previous paragraphs.

It is possible that IC engine 2, PTO spline S and hydraulic machine 6 are connected to planetary gear 5 in a different way than that shown in FIG. 2.

PTO spline S may be either a single body with shaft 15 or coupled to shaft 15.

Both power machines 6, 7 may have a variable displacement.

According to one embodiment, control manifold 24 may be designed to provide loop 20 with high pressure fluid to drive PTO spline S in some or all working conditions. This requires that control valve 21 has a closed centre towards the hydraulic power device that is not mechanically connected to PTO spline S through planetary gear 5. According to the embodiment of FIG. 2, such hydraulic power device is power device 7 and manifold 24 is connected to lines 22, 23. In use, when control valve 21 is in its neutral position, PTO spline S can be fully powered via hydraulic flow from control manifold 24 without a significant power transfer from planetary gear 5. According to another embodiment, hydraulic unit 7 having a variable displacement has two ports each of which may be an input port or an output port depending on the desired rotation direction of hydraulic unit 6. In such an instance, control valve 21 is not necessary and branches 22, 23 connect directly hydraulic units 6, 7.

IC engine may be replaced by a traction electric motor of vehicle 2.

The invention claimed is:

1. A power take-off (PTO) unit for a work vehicle comprising:
   a planetary gear having a first shaft for connection with an engine of the work vehicle;
   a PTO spline connected in power transmission to the planetary gear and defining a gear ratio with the first shaft;
   a hydrostatic transmission driven by the planetary gear to control the gear ratio;
   a pressure sensor unit for sensing a differential pressure across a loop of the hydrostatic transmission; and
   a control unit programmed to calculate:
      a differential pressure drop in the loop on the basis of an actual kinematic status of the planetary gear and from a calibration mathematical model representing an unloaded functioning of the PTO spline; and
      a PTO spline torque from a further mathematical model based on the pressure drop, on pressure signals from the sensor unit, and on kinematic or hydraulic factors of the planetary gear and the hydrostatic transmission.

2. The PTO unit according to claim 1, wherein the calibration mathematical model bases the calculation of the differential pressure on a first angular speed of the engine and on a second angular speed of the PTO spline.

3. The PTO unit according to claim 1, wherein the hydrostatic transmission comprises a first hydraulic power machine coupled to the PTO spline so that a functioning torque path from the first hydraulic power machine to the PTO spline is through the planetary gear and a second hydraulic power machine coupled to the planetary gear and the PTO spline so that a functioning torque path from the second hydraulic power machine to the PTO spline is not through the planetary gear, the first and second hydraulic power machines being connected in hydraulic power transmission via the loop to provide a closed flow recirculation in use.

4. The PTO unit according to claim 3, wherein the first hydraulic machine is a fixed displacement hydraulic machine; the second hydraulic power machine is a variable displacement hydraulic machine; and the further mathematical model is based on the following equations:

$$T_6 = \frac{V_6 * \Delta p}{2\pi} * \epsilon = T_{eng} * \frac{z_{sun}}{z_{ring}}$$

$$T_7 = \frac{\alpha * V_7 * (\Delta p - \Delta p_0)}{2\pi * \epsilon}$$

$$T_{carr} = T_{eng} * \frac{-(z_{sun} + z_{ring})}{z_{ring}}$$

where:
   $z_{sun}$ = number of teeth of a sun gear of planetary gear connected to the first hydraulic power machine;
   $z_{ring}$ = number of teeth of a ring gear of planetary gear connected to both the PTO spline and the second hydraulic machine;
   $V_6$ = hydraulic fixed displacement of the first hydraulic power machine;
   $V_7$ = maximum displacement of the second hydraulic power machine;
   $\alpha$ = fractional displacement of the second hydraulic power machine;
   $\epsilon$ = mechanical-hydraulic efficiency of the first and second hydraulic power machines;
   $\Delta p$ = actual differential pressure measured by the sensor unit;
   $\Delta p_0$ = pressure drop estimated from the calibration mathematical model; and
   $T_6$, $T_7$, $T_{eng}$, $T_{carr}$ = torque on the first hydraulic power machine, second hydraulic power machine, the first shaft and a carrier of the planetary gear, respectively.

5. The PTO unit according to claim 4, further comprising a second shaft parallel to the first shaft for connecting the second hydraulic power machine to the PTO spline, the carrier meshing with the second shaft so that the further mathematical model is also based on the following equation:

$$T_{PTO} = T_{carr} * R_c + T_7$$

Where:

$T_{PTO}$=torque on the PTO spline; and $R_c$=gear ratio between the carrier and the second shaft.

6. The PTO unit according to claim 5, wherein the loop is intercepted by a control valve having an open center for the first hydraulic machine.

7. The PTO unit according to claim 6, wherein control valve has a closed center for the second hydraulic machine so as to block the PTO spline.

8. The PTO unit according to claim 6, further comprising a piloting control valve for piloting the control valve; wherein the planetary gear is oil lubricated; and wherein the piloting control valve is above an oil level when the planetary gear is at rest or above the PTO spline.

9. The PTO unit according to claim 1, wherein the planetary gear comprises a clutch to selectively decouple the first shaft and the PTO spline.

10. The PTO unit according to claim 9, wherein the clutch is configured to selectively decouple the first shaft and a carrier of the planetary gear.

11. A working vehicle comprising a power take-off (PTO) unit comprising:
- a planetary gear having a first shaft for connection with an engine of the work vehicle;
- a PTO spline connected in power transmission to the planetary gear and defining a gear ratio with the first shaft;
- a hydrostatic transmission driven by the planetary gear to control the gear ratio;
- a pressure sensor unit for sensing a differential pressure across a loop of the hydrostatic transmission; and
- a control unit programmed to calculate:
  - a differential pressure drop in the loop on the basis of an actual kinematic status of the planetary gear and from a calibration mathematical model representing an unloaded functioning of the PTO spline; and
  - a PTO spline torque from a further mathematical model based on the pressure drop, on pressure signals from the sensor unit, and on kinematic or hydraulic factors of the planetary gear and the hydrostatic transmission.

12. A method to estimate torque at a power take-off (PTO) spline of a PTO unit for a work vehicle comprising:
- a planetary gear having a first shaft for connection with an engine of the work vehicle;
- a PTO spline connected in power transmission to the planetary gear and defining a gear ratio with the first shaft;
- a hydrostatic transmission driven by the planetary gear to control the gear ratio; and
- a pressure sensor unit for sensing a differential pressure across a loop of the hydrostatic transmission, wherein the method comprises steps of:
- calculating a differential pressure drop in the loop on the basis of an actual kinematic status of the planetary gear and from a first mathematical model representing an unloaded functioning of the PTO spline; and
- calculating the PTO spline torque from a further mathematical model based on the pressure drop, on pressure signals from the sensor unit and on kinematic or hydraulic factors of the planetary gear and the hydrostatic transmission.

\* \* \* \* \*